United States Patent [19]
Mendes

[11] 3,842,887
[45] Oct. 22, 1974

[54] TIRE REPAIR ELEMENT

[76] Inventor: Joseph B. Mendes, 26 Riviera Dr., Agawam, Mass. 01001

[22] Filed: Oct. 2, 1972

[21] Appl. No.: 294,088

[52] U.S. Cl. .............................................. 152/370
[51] Int. Cl. ............................................ B60c 21/06
[58] Field of Search ............................. 152/369, 370

[56] References Cited
UNITED STATES PATENTS

| 962,615 | 6/1910 | Bourquenen | 152/370 |
| 1,143,141 | 6/1915 | Rood | 152/370 |
| 2,098,556 | 11/1957 | Tamada | 152/370 |

*Primary Examiner*—M. Henson Wood, Jr.
*Assistant Examiner*—Robert Saifer
*Attorney, Agent, or Firm*—Ross, Ross & Flavin

[57] ABSTRACT

A device facilitating the repair of a puncture in an elastomeric product (e.g., inflatable tubeless tire) which envisions the insertion of an expandable plug and cooperant contracting means into the puncture aperture in manner such that, as the contracting means is caused to be jacked longitudinally outwardly of the puncture aperture, the plug is caused to be expanded laterally in a zone of least resistance so as to define a bulbous like protrusion which grows as the jacking ensues so as to provide a locked or embracing engagement with and tight seal relative to the elastomeric product.

1 Claim, 3 Drawing Figures

TIRE REPAIR ELEMENT

The invention comprehends a device for repairing punctures in elastomeric products and a method for the use of same in the repair of such products.

More particularly, the invention teaches a device for inserting a flexible repair plug and circumscribed contracting means into a puncture in, for example, an inflatable tubeless tire and a technique for securing such plug relative to the tire in locked and sealed engagement therewith.

At the outset, let it be explained first that the repairable tires envisioned for the use hereof are principally of the so-called heavy construction equipment type, which tires may be as much as 6 feet to 8 feet or more in diameter, and second that the expandable plugs envisioned may be of the order of 6 inches to 8 inches or more in length and 1 inch to 2 inches or more in diameter, obviously of sufficient length and thickness dimensions to completely fill a puncture in a tire of any of the sizes comprehended.

As known, the casings of the elastomeric products are resilient and expandable wherefore any repair plug, to function properly by way of ensuring a tight and effective seal, has to be greater in dimension than the puncture hole to be filled.

No prior art device is known which serves to be insertable into a puncture without any need for employment of any additional device for widening the puncture hole so as to allow an easy-to-enter path for the plug or employment of any collar or like protective member so as to protect the plug during the passage through the puncture hole or employment of any lubricant to facilitate plug insertion or of any adhesive to hold the plug in situ, once located.

A preferred embodiment of the puncture repair device thus utilized is illustrated in the drawing, wherein.

Figure 3:
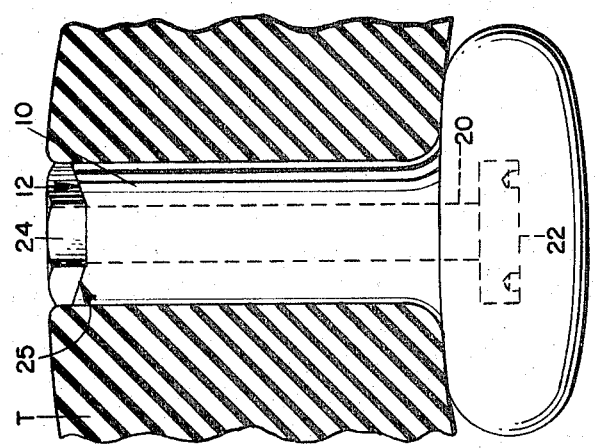
FIG. 3 is a fragmentary sectional view like the FIG. 2 showing except that the device is shown in side elevational view and the outboard free end of the contracting rod has been removed.

A casing of, for example, a tubeless tire, is represented by T in which a puncture has developed.

It will be noted that no previous hole widening operation need be performed and no expansion collar need be placed around the repair device during insertion, the appropriate size of device being selected to best accommodate to the size of the rupture.

The repair device consists of a tubular member 10 formed of an expandable material such as rubber, hereafter identified as the plug.

Various sizes for such plug are contemplated and may vary in length between 6 inches and 8 inches or even more or even less and may vary in diameter between 1 inch and 2 inches or even more or even less.

Extendable through plug 10 is a longitudinal central aperture of sufficient diameter to permit insertion therethrough of an elongate threaded contracting rod 20 having integrally or otherwise formed at its inboard extremity a flanged base 22 and being provided at its outboard extremity with an adjustment member in the form of a hexagonal walk down nut 24, which nut, when turned as by a wrench, effects longitudinal movement of rod 20 by virtue of the threaded interengagement of such components.

The inboard end face 11 of plug 10 seats on a shoulder 23 of flanged base 22 and the outboard end face 12 of the plug, which may be tapered as shown, seats on a complemental end face 25 of walk down nut 24.

The outer surface of plug 10 may be provided with ribbing or may be otherwise roughened along its length to aid in bearing against the surface of a puncture in the elastomeric product casing to insure a secure sealing fit for the plug.

Figure 1:
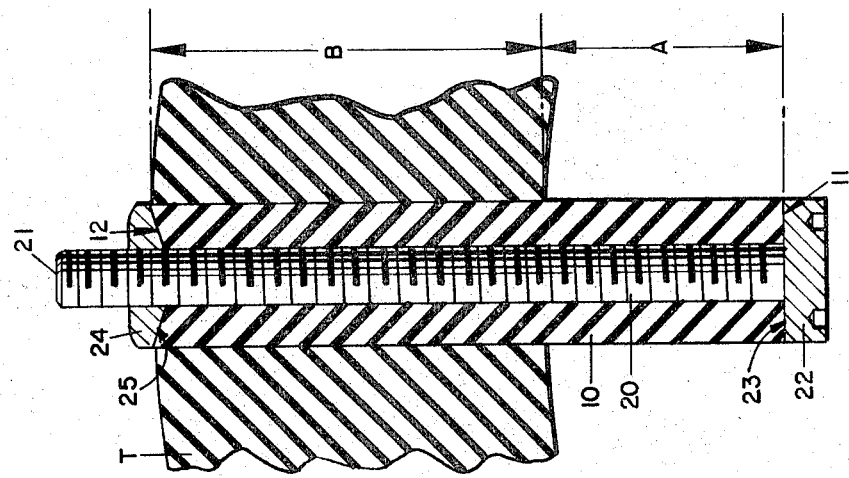
FIG. 1 is a fragmentary sectional view through the puncture in a tire and through the puncture repair device of the invention, all being shown at the first stage moment of initial insertion into the tire, the interior of the tire being at the bottom.

Operationally, the device of the invention is utilized in the method hereof employing the following technique, referring first to FIG. 1.

The device is inserted into and through the puncture so that the inboard end thereof extends freely into the tire and the outboard end thereof is relatively flush with the outer wall of the tire in manner such that nut 24 may be mechanically engaged by a wrench with the free outboard terminal 21 of the rod extending outwardly of said nut.

Figure 2:
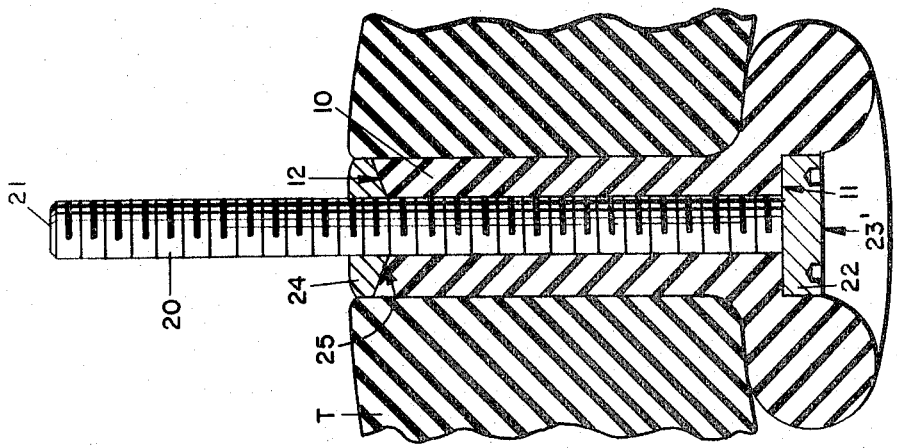
FIG. 2 is a similar view being shown at the second stage moment of final contraction of the device relative to the tire.

Walk down nut 24 is rotated, as by a wrench, so as to cause the rod to be driven outwardly or upwardly as viewed in FIGS. 1 and 2 causing base member 22 to bear against plug 10 in manner such that an increasing tensile force is thus produced contracting the plug along its length and concomitantly increasing the width or diameter dimension thereof as will be seen.

That portion of plug 10 denoted in FIG. 1 as zone A represents that portion which is free to expand upon compression, the portion denoted as zone B being restricted by circumscribing tire T from similarly expanding upon compression. In other words, the plug expands in the area where the least resistance is realized.

Walk down of nut 24 effects compression of plug 10 lengthwise thereof with a resultant expansion throughout an ever decreasing zone A (i.e., ever decreasing in its length as walk down progresses. That is, the plug moves radially increasingly outwardly as walk down continues, and at the same time reduces the longitudinal dimension of zone A wherefore the plug assumes something of an annular or doughnut-like configuration denoted D in FIG. 2 with a portion thereof extending outwardly of the vertical plane of the outer end face 23' of base member 22.

That is, as rod 20 is jacked longitudinally outwardly of the puncture aperture by the tightening of nut 24, the plug is caused to be expanded laterally to define a bulbous enlargement of the inboard end portion of the plug which is tightly embraceable against the adjacent inner face of the tire.

If in operational use, any leakage develops, additional takeup of nut 24 can be effected so as to increase the seal between plug and tire.

I claim:

1. A device for repair of a puncture in a resilient elastomeric tire comprising:
    an expandable cylindrical rubber plug having a longitudinal central aperture therethrough,
    a threaded contracting rod extendable through the plug aperture and having a flanged base of a diameter no greater than the diameter of the plug located adjacent one extremity of the rod in embracement with the respective end of the plug, the contracting rod and circumscribing plug being unitarily insertable through the puncture and extendable outboard and inboard of the tire walls on opposite sides thereof with the base of the rod being disposed at the inboard side of the tire, and a nut threadedly engageable with and walkable downwardly on the contracting rod at the opposite extremity thereof as longitudinal movement of the contracting rod directionally toward the outboard side of the tire is achieved in a plug-compressing manner for forming an increased thickness of the plug in the area between the rod base and tire as the nut is walked down the contracting rod toward the enlargement.

* * * * *